United States Patent
Sato

(10) Patent No.: US 8,908,301 B2
(45) Date of Patent: Dec. 9, 2014

(54) VIBRATION ACTUATOR, LENS BARREL, AND CAMERA

(75) Inventor: Takahiro Sato, Yokohama (JP)

(73) Assignee: Nikon Corporation, Tokyo (JP)

( * ) Notice: Subject to any disclaimer, the term of this patent is extended or adjusted under 35 U.S.C. 154(b) by 182 days.

(21) Appl. No.: 13/375,981

(22) PCT Filed: Jun. 2, 2010

(86) PCT No.: PCT/JP2010/059348
§ 371 (c)(1),
(2), (4) Date: Feb. 21, 2012

(87) PCT Pub. No.: WO2010/140619
PCT Pub. Date: Dec. 9, 2010

(65) Prior Publication Data
US 2012/0147490 A1 Jun. 14, 2012

(30) Foreign Application Priority Data
Jun. 3, 2009 (JP) .................................. 2009-133896

(51) Int. Cl.
G02B 7/02 (2006.01)
G02B 7/08 (2006.01)
H02N 2/16 (2006.01)

(52) U.S. Cl.
CPC . *H02N 2/163* (2013.01); *G02B 7/08* (2013.01)
USPC ...................................................... 359/824

(58) Field of Classification Search
USPC ............................................... 359/824, 822
See application file for complete search history.

(56) References Cited

U.S. PATENT DOCUMENTS

| 4,484,099 | A | 11/1984 | Kawai et al. |
| 6,320,299 | B1 | 11/2001 | Kitani et al. |
| 8,035,276 | B2 * | 10/2011 | Ashizawa ................ 310/323.04 |
| 2005/0104476 | A1 | 5/2005 | Maruyama et al. |
| 2009/0212662 | A1 * | 8/2009 | Ashizawa ................ 310/323.03 |

FOREIGN PATENT DOCUMENTS

| CN | 1617366 A | 5/2005 |
| JP | B2-1-17354 | 3/1989 |
| JP | A-4-121071 | 4/1992 |
| JP | A-2000-209878 | 7/2000 |
| JP | A-2005-328582 | 11/2005 |
| JP | A-2008-259266 | 10/2008 |

OTHER PUBLICATIONS

International Search Report mailed Aug. 31, 2010 issued in International Patent Application No. PCT/JP2010/059348 (with translation).
Dec. 24, 2013 Office Action issued in Japanese Patent Application No. 2011-518471.
Dec. 25, 2013 Office Action issued in Chinese Patent Application No. 201080025002.6.

* cited by examiner

*Primary Examiner* — Alicia M Harrington
(74) *Attorney, Agent, or Firm* — Oliff PLC

(57) ABSTRACT

Disclosed is a vibration actuator which can be arranged in a limited space, and which has excellent drive performance. Also disclosed are a lens barrel and a camera, which are provided therewith. Specifically disclosed is a vibration actuator which includes: a piezoelectric body which has a first surface, and which is excited by an electrical signal; a vibration body which is joined to the first surface, and which has a second surface on which vibration waves are generated by the excitation; and a moving body which is brought into pressure contact with the second surface, and which moves relatively to the vibration body, wherein the thickness of the piezoelectric body is different in the direction of the relative movement of the moving body.

8 Claims, 8 Drawing Sheets

VIBRATION ACTUATOR, LENS BARREL, AND CAMERA

TECHNICAL FIELD

The present invention relates to a vibration actuator, and to a lens barrel and a camera that are provided therewith.

BACKGROUND ART

A vibration actuator utilizes expansions and contractions of a piezoelectric body to generate progressive oscillation waves at a driving surface of an elastic body. Elliptical motions are generated at the driving surface by the progressive waves, and a moving element that is in pressure contact with wave peaks of the elliptical motions is driven (see Patent Document 1). This vibration actuator is characterized by having high torque even at low speeds of rotation. Therefore, when it is mounted in a driving device, there are benefits in that gears may be omitted, gear noise is eliminated, and positioning accuracy may be improved.

Patent Document 1: Examined Patent Application Publication H01-17354

DISCLOSURE OF THE INVENTION

Problems to be Solved by the Invention

As digital cameras and lens barrels have become more compact in recent years, a space for arranging a vibration actuator has become more limited. However, if the vibration actuator is made smaller as a whole in order to fit into the space, the diameter of a vibrating element becomes smaller, and therefore the generated torque tends to fall.

An object of the present invention is to provide a vibration actuator that can be arranged even in a limited space and that has excellent drive performance, and a lens barrel and a camera which are provided therewith.

Means for Solving the Problems

The present invention solves the above problem with the following solution.

In a first aspect of the invention, a vibration actuator is provided, which includes: a piezoelectric body that includes a first surface and is excited by an electrical signal; a vibration body that is joined to the first surface and includes a second surface at which a vibration wave is generated by the excitation; and a moving body that is in pressure contact with the second surface and moves relative to the vibration body, wherein thickness of the piezoelectric body varies along a relative movement direction of the moving body.

In a second aspect of the invention, the vibration actuator according to the first aspect is provided, in which the piezoelectric body includes, a plurality of electrode portions that are formed to be divided along the relative movement direction, at a third surface opposite to the first surface, and the piezoelectric body has a constant thickness in a region in which a single electrode portion is formed.

In a third aspect of the invention, the vibration actuator according to the first aspect or the second aspect is provided, in which the piezoelectric body includes an inner periphery portion at which a circular aperture is provided and an outer periphery portion with an elliptical shape, and the thickness of the piezoelectric body is larger at major axis sides of the elliptical shape than at minor axis sides.

In a fourth aspect of the invention, the vibration actuator according to the third aspect is provided, in which lengths in a circumferential direction of inner periphery portion sides of the plurality of electrode portions are equal to one another.

In a fifth aspect of the invention, the vibration actuator according to the third or fourth aspect is provided, in which the relative movement direction of the moving member is a direction along the circumferential direction at the inner periphery portion of the piezoelectric body.

In a sixth aspect of the invention, the vibration actuator according to any one of the third to fifth aspects is provided, in which the moving member includes an annular shape and is provided in contact with positions of the second surface along the circumferential direction at the inner periphery portion of the piezoelectric body.

In a seventh aspect of the invention, the vibration actuator according to any one of the first to fifth aspects is provided, in which a plurality of grooves are formed at a second surface side of the vibration body in a combtooth shape, and depths of the grooves in a direction orthogonal to the relative movement direction of the moving body vary along the relative movement direction of the moving body.

In an eighth aspect of the invention, a lens barrel is provided, which is provided with the vibration actuator according to any one of the first to seventh aspects.

In a ninth aspect of the invention, a camera is provided, which is provided with the vibration actuator according to any one of the first to seventh aspects.

The constitutions described above may be suitably modified, and at least portions thereof may be substituted with other constituents.

Effects of the Invention

According to the present invention, the vibration actuator that can be arranged in a limited space and has excellent drive performance, and the lens barrel and camera equipped therewith, may be provided.

EXPLANATION OF REFERENCE NUMERALS

1: Lens Barrel;
3: Camera;
10: Vibration Actuator;
12: Vibration Body;
12d: Driving Surface;
13: Piezoelectric Body;

13a: Contact Surface;
13d: Aperture;
13r: Inner Periphery Portion;
13R: Outer Periphery Portion;
15: Moving Element;
D2 to D9: Electrode Portion

PREFERRED MODE FOR CARRYING OUT THE INVENTION

First Embodiment

Herebelow, a first exemplary embodiment of the present invention is described with reference to the attached drawings and suchlike. The following embodiment describes an ultrasonic motor, as an example of the vibration actuator.

Figure 1:
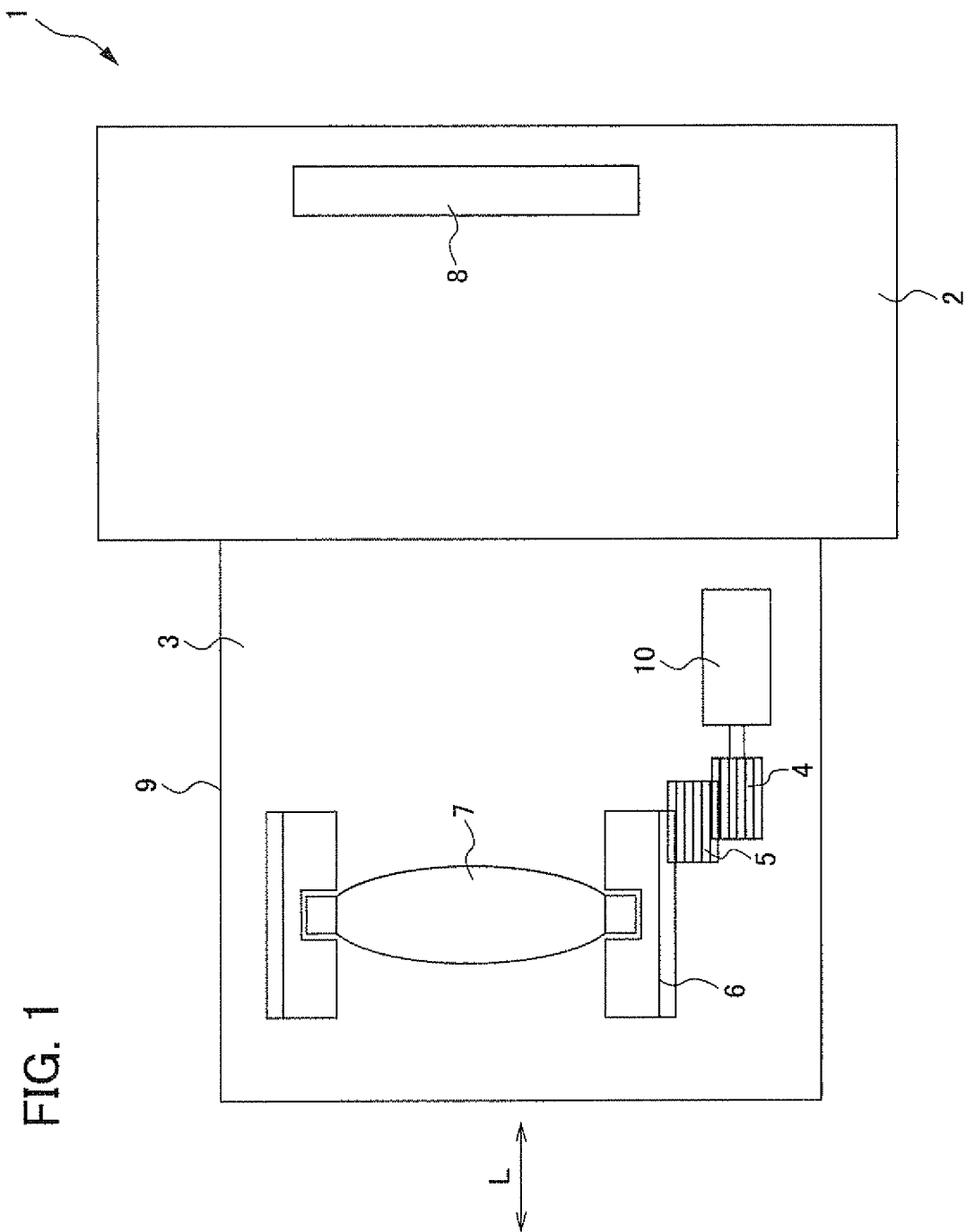
FIG. 1 is a diagram describing a camera of a first embodiment of the present invention.
Figure 2:
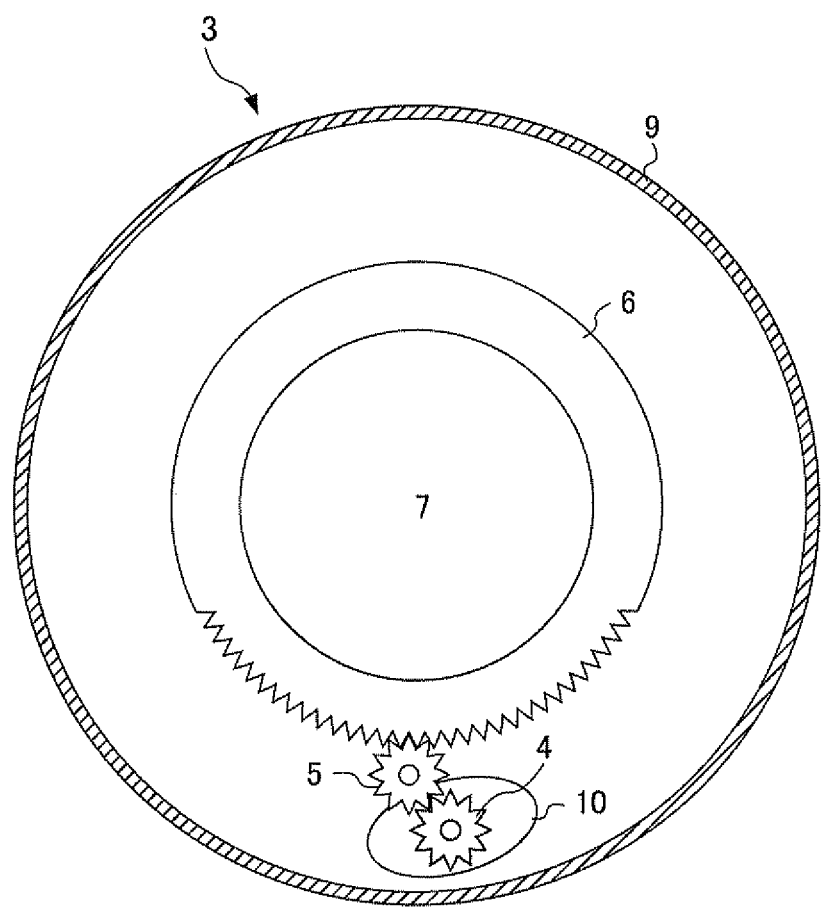
FIG. 2 is a diagram in which the interior of a lens barrel of the camera is viewed from the object side.

FIG. 1 is a diagram describing a camera 1 of the first embodiment of the invention. FIG. 2 is a diagram in which the interior of a lens barrel 3 of the camera 1 is viewed from the object side. The camera 1 is provided with a camera body 2 including an imaging device 8 and the lens barrel 3 including a lens 7. The lens barrel 3 is an interchangeable lens which is attachable to and detachable from the camera body 2. In the present embodiment, an example is illustrated in which the lens barrel 3 is an interchangeable lens, but this is not a limitation. For example, the lens barrel may alternatively be a lens barrel of a type that is integral with a camera body.

The lens barrel 3 is provided with the lens 7, a cam tube 6, gears 4 and 5, an ultrasonic motor 10, a casing 9 enclosing these members, and so forth. In the present embodiment, the ultrasonic motor 10 is arranged in an annular gap between the cam tube 6 and the casing 9, as illustrated in FIG. 2. The ultrasonic motor 10 is used as a drive source that drives the lens 7 during focusing operations of the camera 1. A driving force provided from the ultrasonic motor 10 is transmitted to the cam tube 6 via the gears 4 and 5. The lens 7 is retained in the cam tube 6. The lens 7 is a focusing lens that is moved substantially parallel to an optical axis direction (the direction of an arrow L shown in FIG. 1) by the driving force provided by the ultrasonic motor 10 to adjust a focus point.

In FIG. 1, an image of an object is focused at an imaging plane of the imaging device 8 by an unillustrated lens unit (including the lens 7) that is provided inside the lens barrel 3. The focused object image is converted to electronic signals by the imaging device 8, and these signals are A/D-converted. Thus, image data is obtained.

Figure 3:
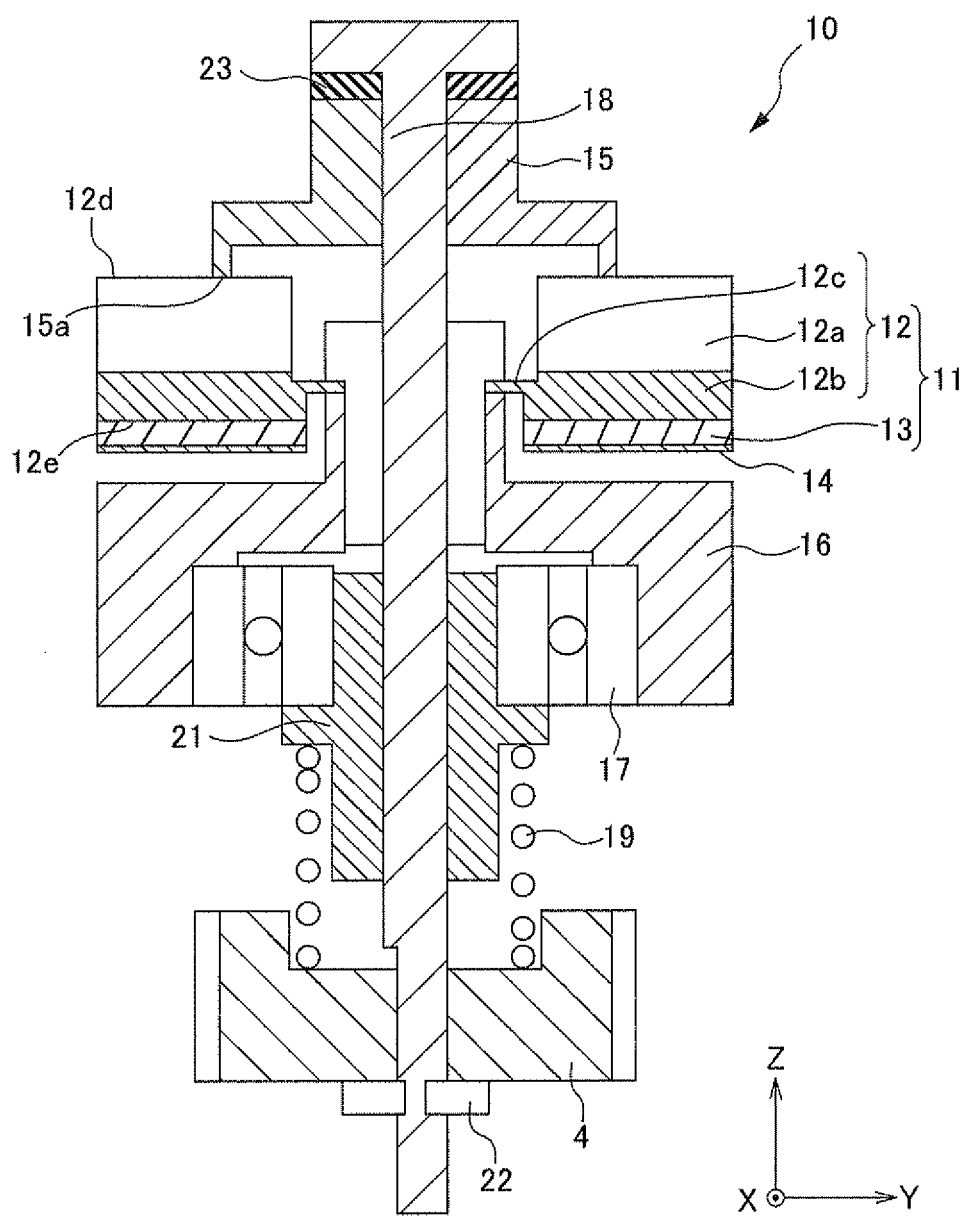
FIG. 3 is a cross-sectional diagram of an ultrasonic motor of the first embodiment.

FIG. 3 is a cross-sectional diagram of the ultrasonic motor 10 of the first embodiment. An XYZ orthogonal coordinate system is established for ease of understanding in FIG. 3 and FIG. 4 to FIG. 6 to be described below. A direction parallel to an axial direction of an output shaft 18 is a Z-axis direction and, in the Z-axis direction, a direction toward a moving element 15 is a +Z direction. An external shape of a vibrating element 11 as seen from the +Z direction (the moving element 15 side) is an elliptical shape. A direction parallel to the major axis of the elliptical shape (see the major axis in FIG. 4) is an X-axis direction, and a direction parallel to the minor axis (see the minor axis in FIG. 4) is a Y-axis direction.

The ultrasonic motor 10 of the first embodiment is provided with the vibrating element 11, the moving element 15, the output shaft 18, a pressing member 19 and so forth. The ultrasonic motor 10 is configured such that the vibrating element 11 is fixed and the moving element 15 is driven to rotate. The vibrating element 11 is a hollow member, including an elastic body 12 and a piezoelectric body 13 that is joined to the elastic body 12. The elastic body 12 is a member that is formed of a metallic material with a large resonance peak sharpness. The elastic body 12 is in a hollow shape whose external shape is substantially elliptical (see FIG. 4A). The elastic body 12 includes a combtooth portion 12a, a base portion 12b and a flange portion 12c.

The combtooth portion 12a is formed to have a plurality of grooves 30 (illustrated in FIG. 4) at its face that is in contact with the moving element 15. Distal end faces of the combtooth portion 12a are in pressure contact with the moving element 15, and form a driving surface 12d that drives the moving element 15. A lubricating surface treatment is applied to this driving surface, such as Ni—P (nickel-phosphorus) plating or the like. The reason for providing the combtooth portion 12a is to bring a neutral plane of progressive waves, which are generated at the driving surface 12d by expansion and contraction of the piezoelectric body 13, as close as possible toward the piezoelectric body 13, thereby amplifying the amplitudes of the progressive waves at the driving surface 12d.

The base portion 12b is a portion that is continuous in a circumferential direction of the elastic body 12. The piezoelectric body 13 is joined to a face 12e opposite to the combtooth portion 12a of the base portion 12b. The flange portion 12c is a brim-form portion protruding inward in a radial direction of the elastic body 12, and is disposed centrally in a thickness direction of the base portion 12b. The vibrating element 11 is fixed to a fixing member 16 by this flange portion 12c.

The piezoelectric body 13 is a piezoelectric body that converts electrical energy to mechanical energy. In the present embodiment, a piezoelectric element is used for the piezoelectric body 13, but an electrostriction element or the like is alternatively applicable. The piezoelectric body 13 is described in more detail below. The piezoelectric body 13 is joined to the elastic body 12 using an adhesive or the like.

Wiring of a flexible printed circuit board 14 is connected to electrode portions of the piezoelectric body 13. The flexible printed circuit board 14 features the function of supplying driving signals to the piezoelectric body 13. The piezoelectric body 13 expands and contracts in accordance with the driving signals supplied from the flexible printed circuit board 14. Accordingly, the elastic body 12 is excited and progressive waves are generated at the driving surface of the elastic body 12. In the present embodiment, four progressive waves are generated.

The moving element 15 is a member that is driven to turn by the progressive waves generated at the driving surface of the elastic body 12. The moving element 15 is a substantially circular disc-shaped member formed of a light metal such as aluminum or the like, and includes a contact surface 15a that touches against the vibrating element 11 (i.e., the driving surface 12d of the elastic body 12). The contact surface 15a has a substantially annular shape. The contact surface 15a is externally subjected to a surface treatment such as anodization or the like in order to improve abrasion resistance. The output shaft 18 is a substantially circular rod-shaped member. One end of the output shaft 18 is in contact with the moving element 15 via a rubber member 23, so as to turn integrally with the moving element 15.

The rubber member 23 is a substantially annular member formed of rubber. This rubber member 23 has the function of making the moving element 15 and the output shaft 18 integrally turnable, with viscoelasticity due to the rubber, and the function of absorbing vibrations such that the vibrations are not transmitted from the moving element 15 to the output shaft 18. Butyl rubber, silicon rubber, propylene rubber or the like is used for the rubber member 23.

The pressing member 19 is a member that generates a pressure force that puts the vibrating element 11 and the moving element 15 into pressure contact. The pressing member 19 is provided between the gear 4 and a bearing holding member 21. In the present embodiment the pressing member 19 employs a compression coil spring, but this is not a limitation.

The gear 4 is slid on so as to fit onto a D-cut of the output shaft 18 and fixed by a stopper 22 such as an E-ring or the like. Accordingly, the gear 4 is integral with the output shaft 18 in a rotation direction and an axial direction. The gear 4 rotates together with rotation of the output shaft 18, thereby transmitting a driving force to the gear 5 (see FIG. 1).

The bearing holding member 21 is disposed at an inner radial side of a bearing 17. The bearing 17 is disposed at an inner radial side of the fixing member 16. The pressing member 19 presses the vibrating element 11 toward the moving element 15 in the axial direction of the output shaft 18. The moving element 15 is put into pressure contact with the driving surface of the vibrating element 11 by this pressing force, and is driven to turn. A pressure regulation washer may be provided between the pressing member 19 and the bearing holding member 21, such that a suitable pressure force for driving of the ultrasonic motor 10 is obtained.

Figure 4A:
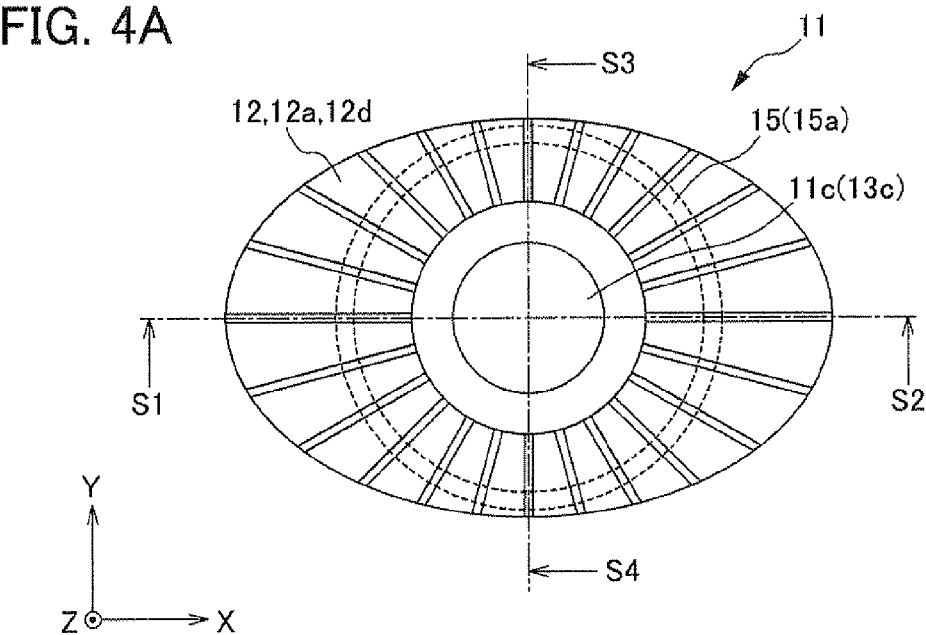
FIGS. 4A-4C are diagrams illustrating a vibrating element of the first embodiment.
Figure 4B:
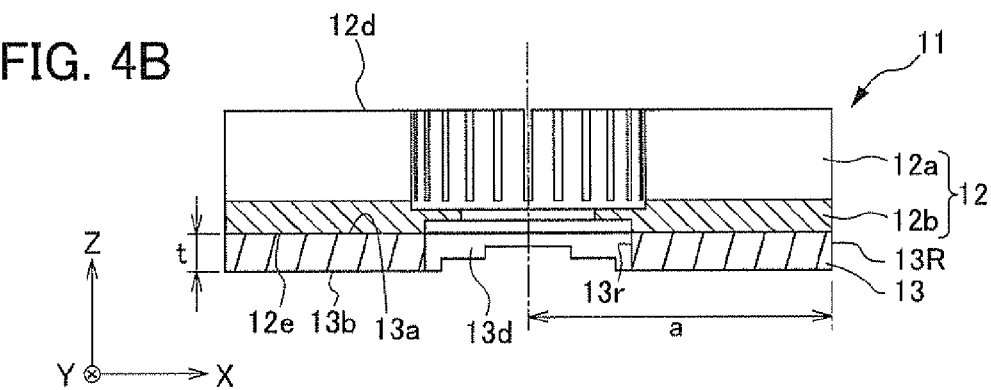
Figure 4C:
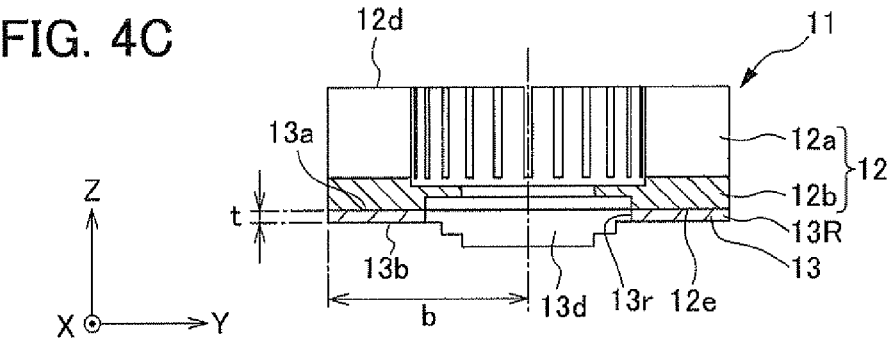

Next, the vibrating element 11 of the present embodiment is described in detail. FIG. 4 is a diagram illustrating the vibrating element 11. FIG. 4A is a diagram in which the vibrating element 11 is seen from the moving element 15 side, FIG. 4B is a cross-sectional diagram of the vibrating element 11 taken along a cross-section of arrows S1-S2, parallel to an XZ plane, and FIG. 4C is a cross-sectional diagram of the vibrating element 11 taken along a cross-section of arrows S3-S4, parallel to a YZ plane. Broken lines in FIG. 4A show a shape of the contact surface 15a of the moving element 15 that comes in contact with the driving surface 12d. The contact surface 15a is in contact with the driving surface 12d in the region shown by these broken lines.

Figure 5A:
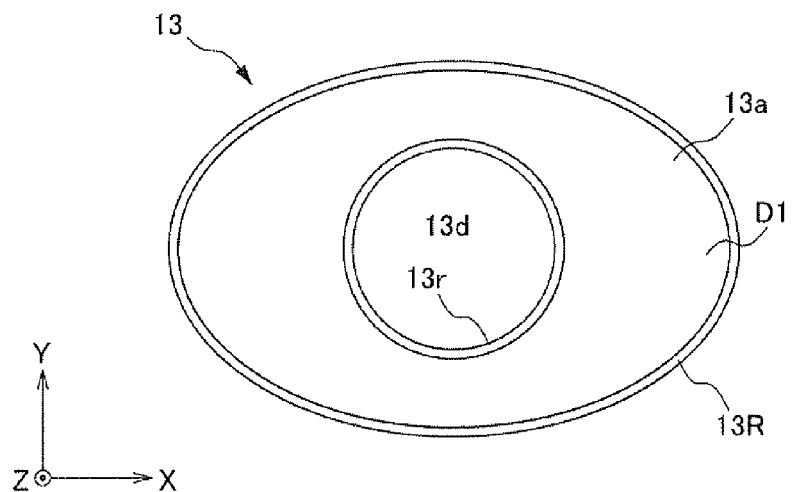
FIGS. 5A and 5B are diagrams illustrating a piezoelectric body of the first embodiment.
Figure 5B:
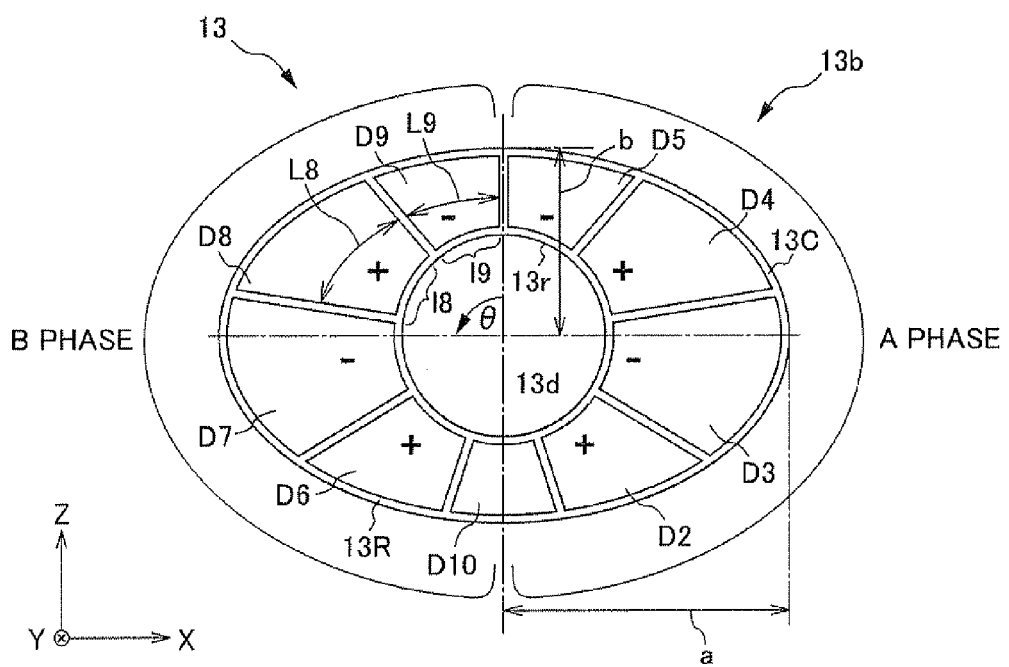

FIG. 5 is a diagram illustrating the piezoelectric body 13 of the present embodiment. FIGS. 5A and 5B are diagrams in which a contact surface 13a of the piezoelectric body 13 joined to the elastic body 12 is viewed from an elastic body 12 side, and FIG. 5B is a diagram in which a surface 13b of the piezoelectric body 13 opposite to the contact surface 13a is viewed from a gear member 20 side. An aperture 13d is provided at the middle of the piezoelectric body 13. The piezoelectric body 13 has a substantially flat plate shape with an inner periphery portion 13r at an aperture 13d side, and an outer periphery portion 13R.

The contact surface 13a of the piezoelectric body 13 is a surface that is joined to the elastic body 12. As illustrated in FIG. 5A, an electrode portion D1 is formed over substantially an entire area of the contact surface 13a.

Non-electrolytic plating is used to form the electrode portion D1. In the present embodiment, the electrode portion D1 is a film of non-electrolytic nickel-phosphorus (Ni—P) plating.

As illustrated in FIG. 5B, electrode portions D2 to D10 are formed on the surface 13b opposite to the contact surface 13a of the piezoelectric body 13. The electrode portions D2 to D10 are formed with a predetermined spacing therebetween in a circumferential direction.

A-phase and B-phase electrical signals are inputted to the electrode portions D2 to D5 and D6 to D9. The electrode portion D10 is a ground electrode. An inner periphery end and an outer periphery end of the surface 13b and gaps between the electrode portions D2 to D10 are untreated portions 13c at which the body of the piezoelectric body 13 is exposed. The electrode portions D2 to D5 and D6 to D9 are electrode portions at which A-phase and B-phase driving signals, respectively, are inputted, and are arranged such that polarizations thereof alternate within each phase. The electrode portion D10 is formed between the electrode portion D2 and the electrode portion D6, so as to be between the A-phase (the electrode portions D2 to D5) and the B-phase (the electrode portions D6 to D9).

In the present embodiment, the electrode portions D2 to D10 are formed by the application of a silver paste by screen printing.

As illustrated in FIG. 4 and FIG. 5, the external shape of the vibrating element 11 of the present embodiment including the elastic body 12 and the piezoelectric body 13 is elliptical. The external elliptical shape of the vibrating element 11 is adopted for the following reason. In the case of the present embodiment, as illustrated in FIG. 2, the ultrasonic motor 10 is disposed in the annular gap between the cam tube 6 and the casing 9. If the external shape of the vibrating element 11 is circular rather than elliptical, diametric size thereof will be limited by a width between the cam tube 6 and the casing 9. Accordingly, an electrostatic capacity of the piezoelectric body would also be limited.

However, when the piezoelectric body is made elliptical, the electrostatic capacity increases in association with an increase in a major axis. This is because, if conditions such as thickness, permittivity and the like are constant, the electrostatic capacity of the piezoelectric body is proportional to the area of a region in which the piezoelectric body is polarized. Accordingly, the polarized region may be made larger by making an area of the piezoelectric body larger. That is, if an area of the contact surface between the piezoelectric body and the elastic body is made larger, the region at which the piezoelectric body is polarized may be made larger, and the electrostatic capacity of the piezoelectric body may be increased. Thus, a larger driving force will be obtained.

Thus, according to the present embodiment, because the vibrating element 11 (the piezoelectric body 13) is elliptical, the vibrating element 11 may be disposed in a location in which plentiful space is not permitted in one direction (the Y direction in the present embodiment) such as, for example, the annular gap between the cam tube 6 and the casing 9, and the space may be utilized to provide a maximum torque.

Now, as illustrated in FIG. 5B, circumferential direction widths I at the inner periphery portion 13r of the electrode portions D2 to D9 formed at the surface 13b opposite to the contact surface 13a of the piezoelectric body 13, (for example, widths 18 and 19 of the electrode portions D8 and D9) are constant, to make the period of the progressive waves constant. When the circumferential direction widths I of the inner periphery portion 13r are made constant, because the piezoelectric body 13 is elliptical, the respective shapes and areas of the electrode portions D2 to D9 are different.

Although not directly applicable to portions of an elliptical shape (approximate fan shapes) as in the present embodiment, the following expression generally stands for objects with, for example, rectangular bodies.

$$\Delta L = d_{31} \times V \times L / t \tag{1}$$

In this expression, L represents length, $\Delta L$ represents a length direction displacement, V represents an applied voltage, $d_{31}$ is a d coefficient of a piezoelectric body, and t represents thickness.

If respective circumferential direction lengths at substantially central portions of the electrode portions D2 to D9 (i.e., central portions between the inner periphery portion 13r and the outer periphery portion 13R) are denoted as L, lengths L differ depending on which of major axis "a" sides and minor axis "b" sides of the ellipse the lengths L are located. For example, at the electrode portions D8 and D9 of FIG. 5B, a circumferential direction length L8 of the electrode portion D8 at the major axis "a" side is longer than a length L9 of the electrode portion D9 at the minor axis "b" side. Hence, when the respective circumferential direction lengths L of the electrode portions are different, if a constant voltage V is applied, extensions ΔL of the circumferential direction lengths L are different.

When the extensions ΔL of the circumferential direction lengths L of the piezoelectric body 13 are different, the progressive waves that are generated in the elastic body 12 are not generated uniformly in a relative movement direction θ of the moving element 15 (a direction along the circumferential direction at the inner periphery portion of the piezoelectric body 13). Consequently, heights of the progressive waves that are generated at the driving surface 12d of the elastic body 12 are not constant. Accordingly, the moving element 15 is in contact with the elastic body 12 only at parts of the progressive waves where the waves are high, the contact is unstable, and driving force is not sufficiently transmitted.

Therefore, it is preferable if the extensions ΔL of the circumferential direction lengths L are constant between the electrode portions D2 to D9, even when the piezoelectric body 13 has an elliptical shape. In expression (1), $d_{31}$ is a constant. Therefore, if the applied voltage V is constant, then L/t must be constant to make the extensions ΔL of the circumferential direction lengths L constant.

The circumferential direction lengths L of the electrode portions D2 to D9 in the present embodiment vary along the relative movement direction θ of the moving element 15 (depending on circumferential direction positions). Accordingly, the thickness t is varied to be proportional to the circumferential direction lengths L, the thickness t being made larger at the major axis "a" sides of the elliptical shape at which the circumferential direction lengths L are longer and the thickness "t" being made smaller at the minor axis "b" sides of the elliptical shape at which the circumferential direction lengths L are shorter. Thus, L/t is made constant. Here, the thickness is constant in each region in which a single electrode portion is formed.

According to the present embodiment, the following effects are provided.

(1) As described, the thickness "t" is made larger at the major axis "a" sides of the elliptical shape at which the circumferential direction lengths L are longer and the thickness "t" is made smaller at the minor axis "b" sides of the elliptical shape at which the circumferential direction lengths L are shorter, and L/t is made constant. Therefore, the extensions ΔL of the circumferential direction lengths L of the piezoelectric body 13 are constant. Hence, the progressive waves are generated at the moving element 15 uniformly in the relative movement direction θ of the moving element 15 (the direction along the circumferential direction at the inner periphery portion of the piezoelectric body 13), and the heights of the progressive waves generated at the driving surface 12d are constant. As a result, since contact between the moving element 15 and the vibrating element 11 is consistent and stable, a sufficient driving force may be provided.

(2) Because the vibrating element 11 (the piezoelectric body 13) has an elliptical shape, the vibrating element 11 may be disposed in a limited location in which plentiful space may not be permitted in one direction (the Y direction in the present embodiment), and this space may be utilized to provide a maximum torque.

Second Embodiment

Figure 6A:
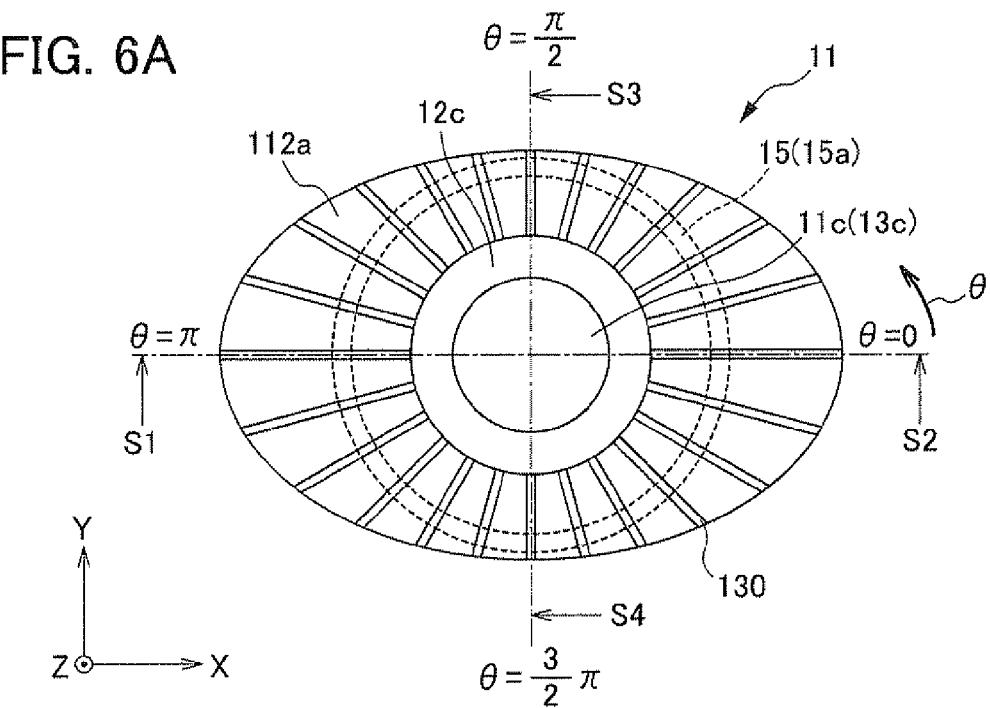
FIGS. 6A-6C are diagrams illustrating a vibrating element of a second embodiment.

Next, a second exemplary embodiment of the present invention is described. FIG. 6 is a diagram illustrating a vibrating element of the second embodiment. In the second embodiment, similarly to the first embodiment, thickness "t" is made larger at major axis "a" sides of an elliptical shape at which circumferential direction lengths L are longer and the thickness "t" is made smaller at minor axis "b" sides of the elliptical shape at which the circumferential direction lengths L are shorter, and L/t is made constant. A difference between the second embodiment and the first embodiment is that depths of grooves 130 of a combtooth portion 112a differ depending on whether of the major axis "a" sides and the minor axis "b" sides of an elastic body 112 the depths of grooves 130 are located. In other respects, the second embodiment is the same as in the first embodiment. Portions that are the same are assigned the same reference symbols and are not described here.

In the present embodiment, the same as in the first embodiment, an external shape of a vibrating element 11 is elliptical. However, when the external shape of the vibrating element 11 (a piezoelectric body 13 and the elastic body 112) is different from a circle, such as an elliptical shape, bending stiffness is higher at the major axis "a" sides, at which a radial direction width of the elastic body 112 is larger, than at the minor axis "b" sides. That is, the bending stiffness varies in a relative movement direction θ of a moving element 15, and vibration amplitudes may not be generated uniformly in the relative movement direction θ.

Figure 6B:
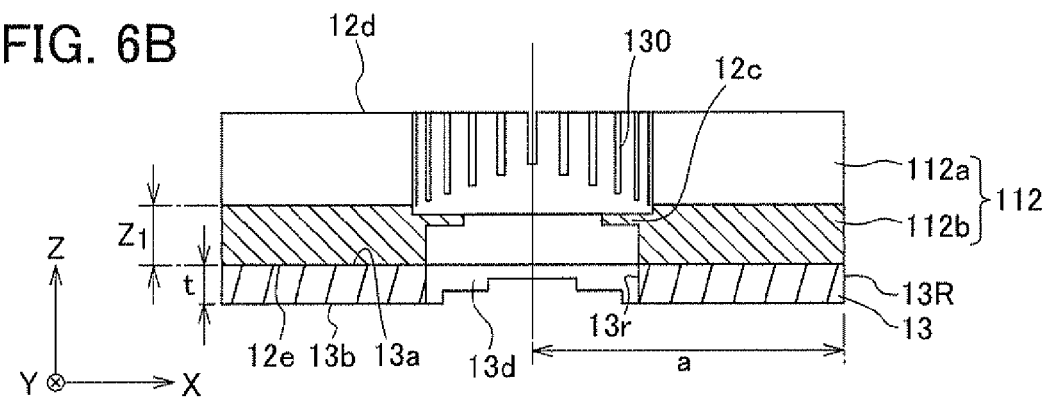
Figure 6C:
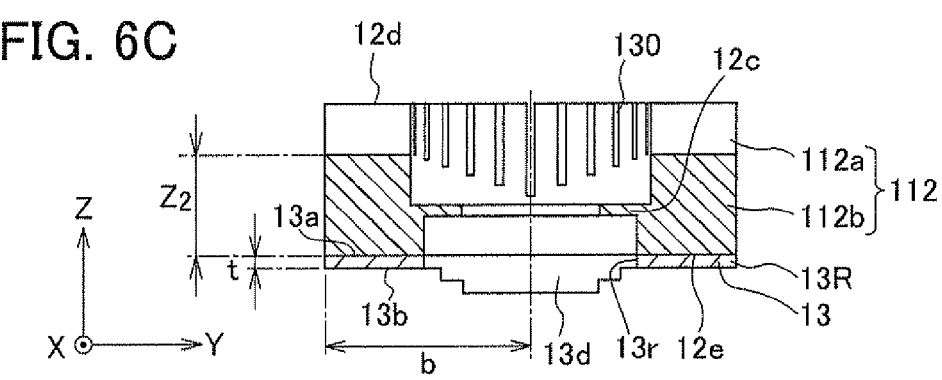
Figure 7A:
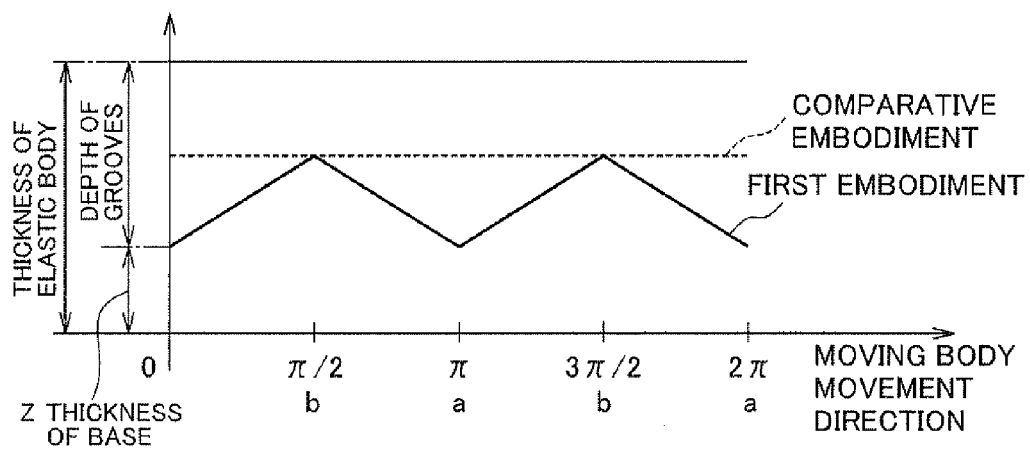
FIGS. 7A and 7B are graphs in which the horizontal axis is the direction of progress of a moving body of the second embodiment and the vertical axis is the depth of grooves.

Accordingly, in the present embodiment, as illustrated in FIG. 6B and FIG. 6C, the depths of the grooves 130 of the combtooth portion 112a are made non-uniform. That is, the grooves 130 are deeper at the major axis "a" sides and the grooves 130 are shallower at the minor axis "b" sides. FIG. 7A is a graph in which the relative movement direction θ is the horizontal axis (θ=0 at a position where the diameter is "a") and the depth of the grooves (which is to say, the thickness of the base) is the vertical axis. The solid line in the graph illustrates the case of the second embodiment and the dotted line illustrates a case in which the depths of the grooves 130 of the combtooth portion 112a are constant.

Figure 7B:
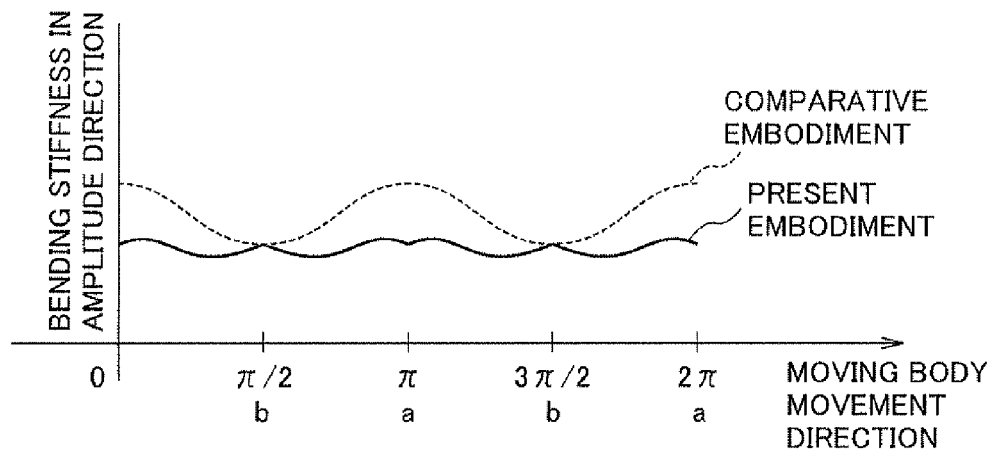

FIG. 7B is a graph in which the relative movement direction θ is the horizontal axis (θ=0 at a position where the diameter is "a") and bending stiffness is the vertical axis. Similarly, in FIG. 7B, the solid line in the graph illustrates the case of the second embodiment and the dotted line illustrates a case in which the depths of the grooves 130 of the combtooth portion 112a are constant. As illustrated, when the depths of the grooves 130 are constant, the bending stiffness is lower in vicinities of the minor axis "b" (θ=σ/2, 3σ/2), and the bending stiffness is higher in vicinities of the major axis "a" (θ=0, σ, 2σ).

In contrast, in the second embodiment, as shown by the solid line in FIG. 7A, the grooves 130 are deeper (a base portion 112b is thinner) in vicinities of the major axis "a" (θ=0, σ, 2σ), than in vicinities of the minor axis "b" (θ=σ/2, 3σ/2). Thus, the grooves 130 are deeper where the radial direction width is larger, at the major axis "a" sides, and the grooves 130 are shallower where the radial direction width is smaller, at the minor axis "b" sides. The radial direction widths and the depths of the grooves 130 counteract one another in their effects on the stiffness, and differences in stiffness between the major axis "a" sides and the minor axis "b" sides are smaller than in the comparative embodiment, as illustrated by the solid line in FIG. 7B.

According to the second embodiment, in addition to the effects of the first embodiment, the following effect is provided.

Because the grooves 130 are deeper where the radial direction width is larger, at the major axis "a" sides, and the grooves 130 are shallower where the radial direction width is smaller, at the minor axis "b" sides, the effects on stiffness of the radial direction widths and the depths of the grooves 130 counteract one another, and the differences in stiffness between the major axis "a" sides and the minor axis "b" sides are reduced.

Variant Embodiments

The exemplary embodiments described above are not limiting; numerous modifications and improvements are possible.

Figure 8A:
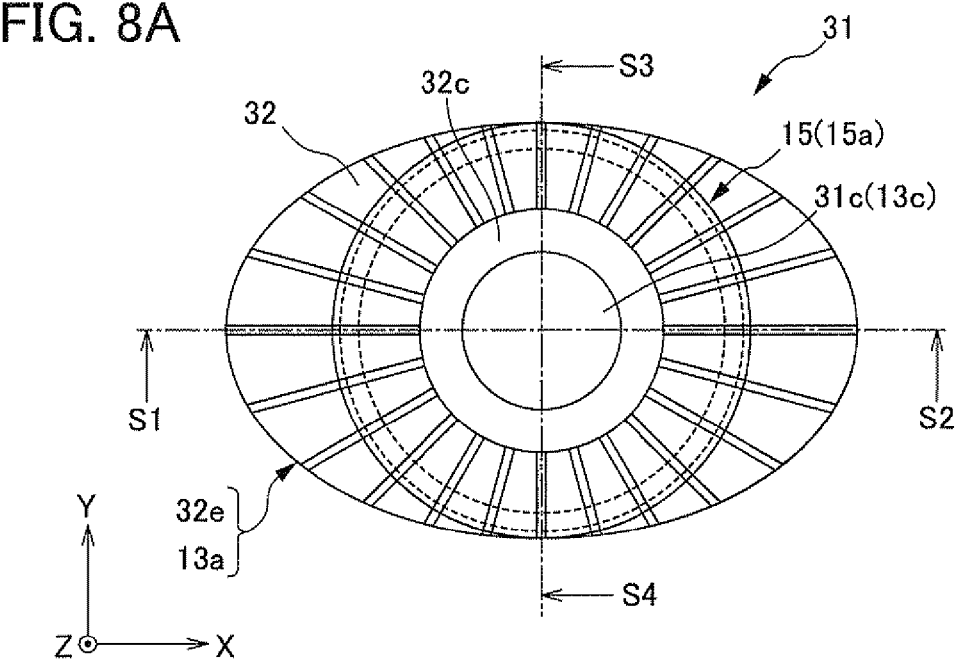
FIGS. 8A-8C are diagrams illustrating a vibrating element of a variant embodiment.
Figure 8B:
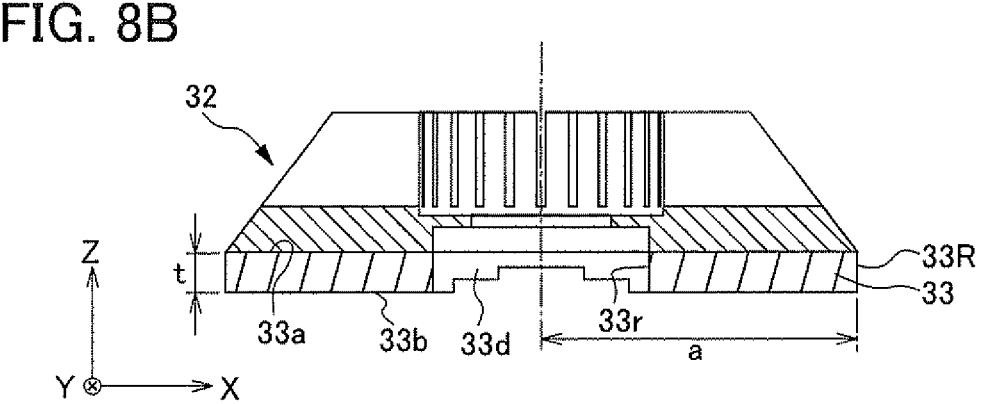
Figure 8C:
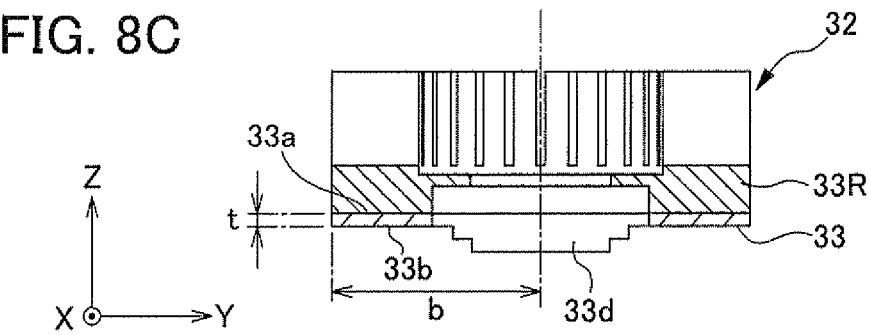

(1) The external shape of the elastic body 12 in the embodiments described above is an elliptical cylinder but the present invention is not limited to this shape. FIG. 8 is a diagram illustrating an elastic body 32 of a variant embodiment. Portions that are the same as in the above embodiments are assigned the same reference symbols. Similarly to FIG. 4A, FIG. 8A is a diagram in which a vibrating element 31 is seen from a moving element 15 side. FIG. 8B is a cross-sectional diagram of the vibrating element 31 taken along a cross-section of arrows S1-S2, parallel to an XZ plane, and FIG. 8C is a cross-sectional diagram of the vibrating element 31 taken along a cross-section of arrows S3-S4, parallel to a YZ plane.

As illustrated, the external shape of the elastic body 32 is an elliptical cone shape with a top portion truncated. With this shape too, a thickness "t" of a piezoelectric body 33 is made larger at major axis "a" sides of the elliptical shape at which circumferential direction lengths L are longer and the thickness "t" is made smaller at minor axis "b" sides of the elliptical shape at which the circumferential direction lengths L are shorter, and L/t is made constant. Thus, even when the elastic body 32 has an elliptical cone shape, the amplitudes of the progressive waves that are generated at the elastic body 32 may be made constant by the thickness of the piezoelectric body 33 being varied between the major axis sides and minor axis sides of the elliptical shape. Since contact between the moving element 15 and the vibrating element 31 (the elastic body 32) is consistent and stable, a sufficient driving force may be provided.

(2) In the exemplary embodiments described above, examples are illustrated in which the external shapes of the piezoelectric body 13 and the elastic body 12 are ellipses, but this is not limiting. For example, the external shape may be a polygon and the thickness of the piezoelectric body varied in accordance with that shape.

(3) In the exemplary embodiments, an ultrasonic motor in which a moving element is driven to rotate is described as an example but this is not limiting. The invention is also applicable to a linear vibration actuator in which a moving element is driven in a linear direction.

(4) In the exemplary embodiments, an ultrasonic motor that uses vibrations in the ultrasonic region is described as an example but this is not limiting. For example, the invention is also applicable to a vibration actuator that uses vibrations outside the ultrasonic region.

(5) In the exemplary embodiments, examples in which an ultrasonic motor is used for driving of a lens during focusing operations are illustrated but this is not limiting. For example, the ultrasonic motor is applicable to driving of a lens during zoom operations.

(6) In the exemplary embodiments, examples in which an ultrasonic motor is used in a camera are illustrated but this is not limiting. For example, the ultrasonic motor may be used in a driving section of a photocopier, a steering wheel tilting apparatus or headrest driving section of an automobile, or the like.

The exemplary embodiments and variant embodiments described above may be appropriately combined, but detailed descriptions are not given here. The present invention is in no way limited by the embodiments described above.

The invention claimed is:

1. A vibration actuator comprising:
   a piezoelectric body that includes a first surface and is excited by an electrical signal;
   a vibration body that is joined to the first surface and includes a second surface at which a vibration wave is generated by the excitation; and
   a moving body that is in pressure contact with the second surface and moves relative to the vibration body,
   wherein thickness of the piezoelectric body varies along a relative movement direction of the moving body,
   wherein the piezoelectric body includes an inner periphery portion at which a circular aperture is provided and an outer periphery portion with an elliptical shape, and
   wherein the thickness of the piezoelectric body is larger at major axis sides of the elliptical shape than at minor axis sides.

2. The vibration actuator according to claim 1, wherein the piezoelectric body includes a plurality of electrode portions that are formed to be divided along the relative movement direction, at a third surface opposite to the first surface, and
   the piezoelectric body has a constant thickness in a region in which a single electrode portion is formed.

3. The vibration actuator according to claim 1,
   wherein lengths in a circumferential direction of inner periphery portion sides of the plurality of electrode portions are equal to one another.

4. The vibration actuator according to claim 1, wherein the relative movement direction of the moving body is a direction along the circumferential direction at the inner periphery portion of the piezoelectric body.

5. The vibration actuator according to claim 1, wherein the moving body includes an annular shape and is provided in contact with positions of the second surface along the circumferential direction at the inner periphery portion of the piezoelectric body.

6. The vibration actuator according to claim 1, wherein
   a plurality of grooves are formed at a second surface side of the vibration body in a combtooth shape, and
   depths of the grooves in a direction orthogonal to the relative movement direction of the moving body vary along the relative movement direction of the moving body.

7. A lens barrel comprising the vibration actuator according to claim 1.

8. A camera comprising the vibration actuator according to claim 1.

* * * * *